United States Patent
Järvenkylä et al.

Patent Number: 5,589,127
Date of Patent: Dec. 31, 1996

[54] METHOD AND APPARATUS FOR FORMING RIBS WITH SIDEWARD PROJECTIONS IN A PLASTIC PIPE, AND A PLASTIC PIPE

[75] Inventors: Jyri Järvenkylä, Hollola, Finland; Dieter Scharwächter, Octrup, Germany; Åke Johansson; Ronny Kristensson, both of Fristad, Sweden

[73] Assignee: Uponor Innovation AB, Fristad, Sweden

[21] Appl. No.: 196,406

[22] Filed: Feb. 15, 1994

[30] Foreign Application Priority Data

Feb. 24, 1993 [FI] Finland ................. 930826

[51] Int. Cl.⁶ ............................... B29D 16/00
[52] U.S. Cl. .............. 264/280; 264/209.3; 425/325; 425/327; 425/335; 425/343; 425/336; 425/366; 425/392; 425/393
[58] Field of Search ................. 425/366, 392, 425/393, 325, 327, 336, 335, 343; 264/209.3, 280, 287

[56] References Cited

U.S. PATENT DOCUMENTS

| | | | |
|---|---|---|---|
| 3,468,020 | 9/1969 | Carlson et al. | 29/597 |
| 3,696,183 | 10/1972 | Steel et al. | 264/164 |
| 3,919,378 | 11/1975 | Smasook | 264/164 |
| 3,962,760 | 6/1976 | Koss et al. | 425/366 |
| 4,024,003 | 5/1977 | Buhler | 264/164 |
| 4,172,916 | 10/1979 | Watson | 264/164 |
| 4,377,544 | 3/1983 | Rasmussen | 264/164 |
| 4,566,496 | 1/1986 | Menzel et al. | 138/154 |
| 4,591,323 | 5/1986 | Boen | 425/392 |
| 4,712,993 | 12/1987 | Lupke | 425/466 |
| 4,753,833 | 6/1988 | Fishgal et al. | 428/36 |
| 4,869,295 | 9/1989 | Keldany | 138/129 |
| 4,936,768 | 6/1990 | Lupke | 425/532 |
| 5,330,600 | 7/1994 | Lupke | 425/327 |
| 5,352,110 | 10/1994 | Hayakawa et al. | 425/366 |

FOREIGN PATENT DOCUMENTS

| | | | |
|---|---|---|---|
| WO90142208 | 11/1990 | WIPO | 264/209.3 |
| WO9100797 | 1/1991 | WIPO | |

*Primary Examiner*—Jan H. Silbaugh
*Assistant Examiner*—Vi Duong Dang
*Attorney, Agent, or Firm*—Ladas & Parry

[57] ABSTRACT

The invention relates to a method and an apparatus for forming ribs with sideward projections in a plastic pipe. The projections are formed by means of elongated rolls (10) each moving around the pipe and rotating about its central axis, the rolls being in an inclined position and at an oblique angle with respect to the central axis of the pipe.

14 Claims, 1 Drawing Sheet

U.S. Patent    Dec. 31, 1996    5,589,127
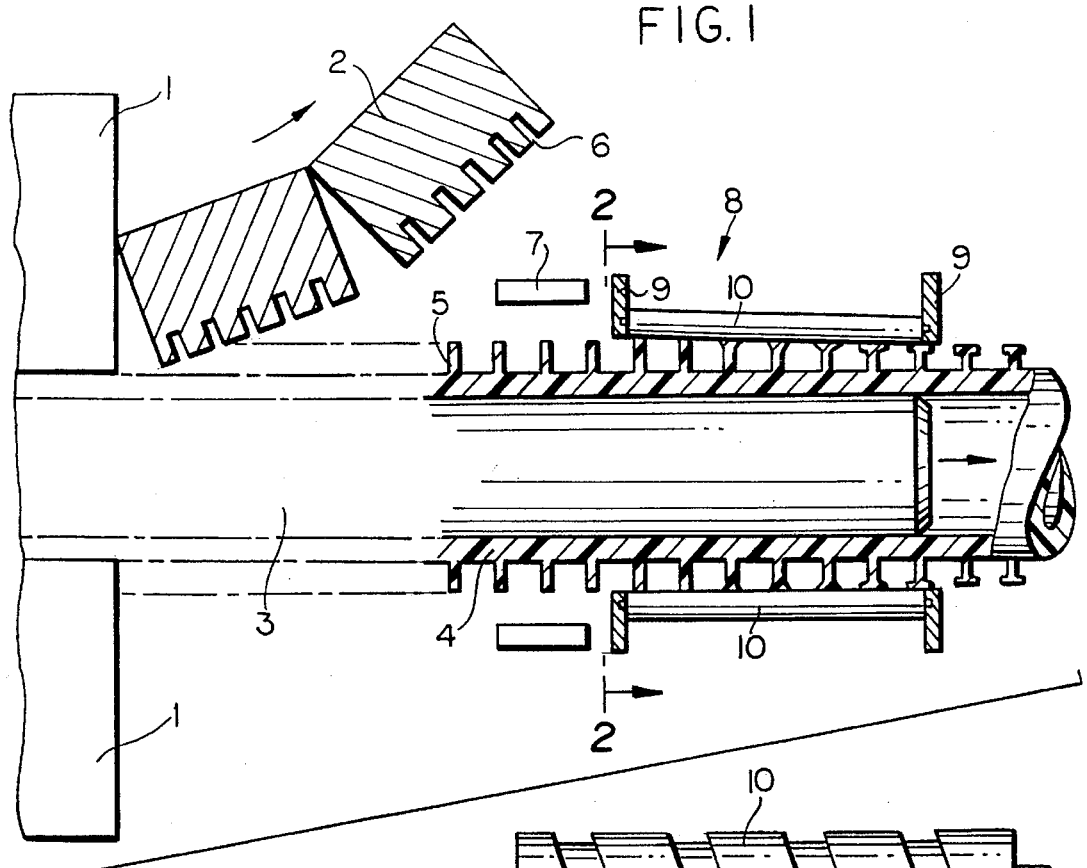
FIG. 1
FIG. 3
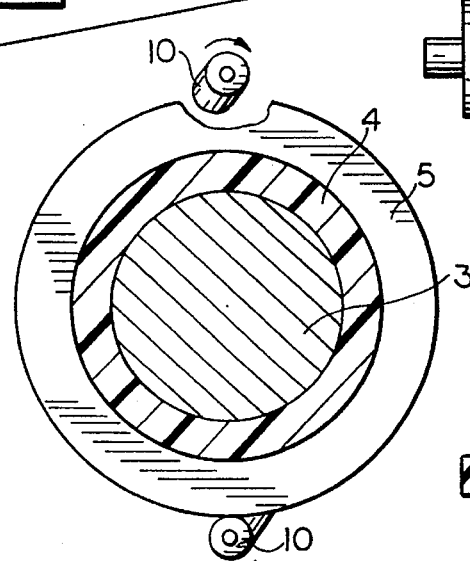
FIG. 2
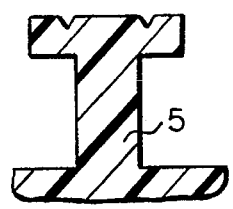
FIG. 4
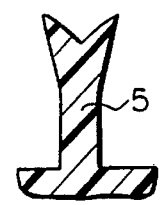
FIG. 5

1

METHOD AND APPARATUS FOR FORMING RIBS WITH SIDEWARD PROJECTIONS IN A PLASTIC PIPE, AND A PLASTIC PIPE

BACKGROUND OF THE INVENTION

This invention relates to an apparatus for forming ribs with sideward projections, preferably T-shaped ribs, in a plastic pipe with annular ribs. The invention also relates to a method for forming ribs with sideward projections, preferably T-shaped ribs, in a plastic pipe with annular ribs. The invention further relates to a pipe having adjacent annular ribs in its outer surface, the areas between the ribs forming grooves for sealing rings arranged at socket joints for sealing the space between the pipe and the socket.

Plastic ribbed pipes are known from the prior art. The provision of ribs on the outer surface of pipes increases the cost of manufacture, but this kind of pipes are nevertheless used very widely as they have many good properties.

Ribs are usually rectangular in cross-section, or they taper slightly from the pipe wall towards their outer edge. U.S. Pat. Nos. 4,566,496 and 4,753,833, however, disclose ribs having a T-shaped cross-section achieved by forming a projection at the outer edges of the ribs on both sides. This shape of the rib increases the rigidity of the pipe against radial compression of the pipe; alternatively, the same rigidity is achieved with less material, which reduces the costs.

However, plastic pipes with T-shaped ribs are not produced on any larger scale, which is mainly due to problems associated with the manufacturing technique. Plastic pipes with annular ribs are produced in so-called corrugators where molten plastic material is fed through a nozzle to form a layer around a mandrel, and the plastic material is surrounded within the area of the mandrel by moving chill moulds with grooves in their inner surfaces for forming the ribs. In order that the chill moulds could be detached from the pipe after moulding the pipe, the sides of the ribs have to be straight. For this reason, plastic pipes with T-shaped ribs have previously been produced from plastic strips having one or more T-shaped ribs on one side. The strips are wound around the mandrel into a spiral, so that a solid plastic pipe is obtained when the strips are seamed. A plastic pipe produced in this way is expensive. It is also to be noted that the ribs on its outer side are not annular but run spirally along the outer surface of the pipe. This is a disadvantage as sealing rings cannot be fitted in the grooves between the ribs at socket joints, or the use of such spiral grooves for sealing purposes is very difficult.

SUMMARY OF THE INVENTION

The object of the present invention is to provide an apparatus and a method by means of which plastic pipes with annular ribs can be provided with T-shaped ribs or other similar ribs. The apparatus according to the invention is characterized in that it comprises rib rolling means surrounding the pipe to be treated and arranged to move with respect to the pipe in its longitudinal direction and to rotate with respect to the pipe, said rib rolling means forming a conical rotation surface decreasing in diameter in the direction of movement of the pipe and comprising elongated rolls disposed circumferentially around the pipe.

A plastic pipe having ribs with sideward projections is achieved by feeding a plastic pipe having ribs rectangular in cross-section in its outer surface through an apparatus according to the invention. Due to the shape of the surface of the rolls the ribs are compressed gradually to an increasing degree when the pipe moves in its longitudinal direction through the apparatus. To achieve the special shape of the roll surface, the axis of rotation of the rolls is inclined with respect to the central axis of the pipe, or the rolls are made conical.

A preferred embodiment of the invention is characterized in that the axis of rotation of the rolls is at an oblique angle to the central axis of the pipe.

Due to the oblique position of the axis of rotation of the rolls, the outer edge of the ribs and the outer surface of the rolls do not slide with respect to each other, which would create a friction effect between the rib and the roll with a result that plastic would accumulate at the outer edge of the rib in front of the roll so that the rib would bend when the plastic accumulation would no longer be able to slide along the edge of the rib but would be squeezed between the roll and the rib. This is avoided in the apparatus according to the invention due to the oblique position of the rolls; the rolls shape the ribs without any sliding or friction between the surfaces. This, of course, holds true only for annular ribs, i.e. ribs at right angles to the central line of the pipe.

In order that the rolls would treat the ribs sufficiently, they have to be long enough. In this respect, it is preferable that the rolls are such in length that they cover a pipe section comprising 5 to 25 ribs, preferably about 10 ribs.

The width of the sideward projections can be adjusted by varying the degree of compression of the ribs, in which case the roll surface may be completely smooth. Alternatively, a spiral groove may be provided in the roll surfaces. The width of the groove corresponds to the width of the rib at the projections, and so the width can be adjusted accurately.

The inclination and obliqueness of the rolls with respect to the central axis of the pipe depends on the length of the rolls, the rigidity of the plastic material under treatment, the degree of compression of the ribs and the feed rate of the pipe. It is, however, advisable that the inclination of the axis of rotation of the rolls with respect to the central axis of the pipe to be treated is such that the outer diameter of the ribs decreases at the rolls 2 to 15%, preferably about 6%, and the oblique angle of the axis of rotation with respect to the central axis is 4° to 45°, preferably about 10°.

To enable the deformation of the ribs of the pipe, the ribs have to be sufficiently warm to be mouldable. To effect this, the rolls may be heatable, but it is also possible that the apparatus comprises a heating device surrounding the pipe and positioned before the rolling means as seen in the direction of movement of the pipe. The heating device exposes the ribs to a heating effect at a point which is to be expanded.

One highly recommendable alternative is to position the apparatus immediately after the means producing ribbed pipe, the mandrel of the pipe producing means being extended up to the rolling means.

The invention also relates to a method for forming ribs with sideward projections, preferably T-shaped ribs, in a plastic pipe with annular ribs.

WO 90/14208 discloses a method for producing a pipe with straight annular grooves by feeding hot plastic material between chill moulds and a cooled mandrel. To calibrate the diameter of the inner surface of the pipe, a vacuum is created between the mandrel and the inner surface of the pipe, as a result of which the ribs shrink in the radial direction. As the shrinkage is uneven, the height of the ribs and thus also the depth of the groove between the ribs varies. Variation in the depth of the groove causes problems when a sealing ring is fitted in the groove as the sideward press effect, that is, the sealing effect, cannot be predicted.

The object of the method according to the invention is to provide a ribbed pipe in which not only the inner diameter of the pipe but also the outer diameter of the ribs is calibrated so that the depth of the grooves between the ribs is constant. The method is characterized in that the ribs are compressed gradually in the radial direction of the pipe by a rolling method until a desired outer diameter of the pipe is achieved and a desired projection is formed in the ribs, whereafter the pipe is cooled.

The invention further relates to a pipe produced by means of the apparatus and the method described above and having adjacent annular ribs in its outer surface. To seal off a space between the pipe and a socket, sealing rings can be fitted in the grooves between the ribs at socket joints. The pipe according to the invention is characterized in that the width of the sealing grooves in the longitudinal direction of the pipe is greater in the vicinity of the pipe wall than at the outer edge of the ribs, so that a sealing groove widening towards the pipe wall is formed.

A major advantage of a sealing groove formed between two annular ribs and widening towards the bottom is that it defines a space into which a sealing ring can be fitted, if required, without any risk of the ring coming off the groove on inserting the spigot into the socket. Such a risk exists with sealing grooves of uniform width over their entire depth and having plenty of space for the sealing ring.

BRIEF DESCRIPTION OF THE DRAWING

In the following the invention will be described in greater detail with reference to the attached drawing, in which FIG. 1 is a side view illustrating the principal features of one embodiment of an apparatus according to the invention;

FIG. 2 is a sectional view of the apparatus along a line II—II; and

FIG. 3 illustrates an embodiment of a roll used in the apparatus, and

FIGS. 4 and 5 show two rib shapes.

DESCRIPTION OF THE PREFERRED EMBODIMENTS

On the left side in FIG. 1, there is shown the terminal end of a production line for ribbed pipes. The figure shows an upper and a lower guide rail 1 within which chili moulds 2 semi-circular in cross-section move so as to form a closed space at the rails for moulding the pipe. The figure shows only two upper chill moulds when they are leaving the pipe surface. A mandrel 3 for forming a central hole in the pipe is positioned on the central line of the moulding space formed by the chill moulds. The plastic pipe formed between the chill moulds and the mandrel is indicated with the reference numeral 4.

The means shown in the figure produce ribbed pipes with a smooth inner surface and an outer wall surface provided with annular ribs 5 formed by plastic material penetrating into grooves 6 in the inner surface of the chill moulds 2. The ribs are thus positioned in a plane perpendicular to the central line of the pipe, and they typically have the cross-sectional shape of a narrow rectangle, or widen slightly from their outer edge towards the pipe wall.

In the embodiment shown in FIG. 1, an apparatus according to the invention is disposed after the pipe producing means, by means of which apparatus the ribs 5 can be provided with sideward projections so that the ribs will be e.g. T-shaped in cross-section, as shown in FIG. 1.

In FIG. 1, the first part of the apparatus according to the invention as seen in the production direction is a heating device 7 which surrounds the pipe and is preferably arranged to heat the ribs by radiation heat at points which are to be deformed. In the figure, the outer edge of the ribs is exposed to the heating effect.

Rib rolling means 8 are disposed after the heating device. They comprise two rings 9 rotating about the pipe with respect to a frame not shown and spaced apart from each other in the longitudinal direction of the pipe, and elongated rolls 10 mounted rotatably between the rings for performing the deformation. The rolls 10 rotate with the rings 9 about the pipe, in addition to which each roll rotates about its central axis. There are at least two rolls, and they are disposed circumferentially around the pipe. The central axis of the rolls 10 is in an inclined position with respect to the central axis of the pipe 4 so that the backward end of the rolls in the production direction of the pipe is closer to the central axis of the pipe than the forward end of the rolls. The inclination of the rolls with respect to the central axis of the pipe is such that the outer diameter of the ribs decreases 2 to 15%, preferably about 6%, within the area of the rolls. In addition, the central axis of the rolls is at an oblique angle to the central axis of the pipe, as appears from FIG. 2. This angle is from 4° to 45°, preferably about 10°. In the embodiment of FIG. 1, the surface of the rolls 10 is smooth. The rolls are preferably of a length such that they cover a pipe section comprising 5 to 25 ribs, preferably about 10 ribs.

The rolls 10 may be heatable, and the heating device 7 can then be omitted. It is to be mentioned here that the heating device 7 may also be omitted if the rolling means 8 are disposed sufficiently close to the pipe producing means, as the pipe is often still soft enough for deforming the ribs on entering the rolling means immediately from the pipe producing means. In such a case the mandrel 3 of the pipe producing means is preferably made long enough to extend up to the back end of the rolling means, as shown in FIG. 1, so that the mandrel supports the pipe when the rolls 10 compress the ribs.

The projection can be formed especially easily if the rib pipe producing means shapes the ribs so that they widen outwardly, that is, the outer edge of the ribs is wider than the stem thereof. The formation of the projection is still easier if the outer edge of the rib is provided with a groove extending in the longitudinal direction of the rib, see FIG. 5.

The rolls may also be connected to a driving motor, and so their surface speed may be equal to or greater or smaller than the speed of the edge of the ribs.

FIG. 3 shows an alternative embodiment of the roll 10. In this embodiment, a spiral groove 11 is formed in the surface of the roll. The groove is so dimensioned that the ribs 5 of the pipe will be positioned at the different winds of the groove 11. The groove enables the maximum width of the projections of the ribs to be adjusted accurately. As distinct from the figure, the width of the groove may increase toward the terminal end of the roll.

An individual roll may comprise several parallel grooves. If desired, the bottom of at least some of the grooves may be provided with brushlike shoulders extending in the longitudinal direction of the grooves. These shoulders impress weakening grooves in the outer surface of the projections at points located substantially in the plane of the side surfaces of the ribs, see FIG. 4. Alternatively, the projections can be positioned in the surface of the grooveless rolls 10.

Due to the weakening grooves, the projection is easily detachable from the rib when the space between two adjacent ribs is to be used as a sealing groove in which a conventional sealing ring, e.g. circular in cross-section, is to be positioned.

The apparatus according to the invention operates in the following way. When the plastic pipe 4 with the ribs 5 emerges from the pipe producing means, the rib portions to be expanded are heated by means of the heating device 7, if required, whereafter the heated ribs move into the rolling means 8. In the rolling means, the rolls 10 compress the ribs partially in the radial direction of the pipe by a rolling method until a desired projection is formed in the ribs. Due to the inclined position of the rolls 10, the compression takes place gradually, and due to the oblique position of the rolls 10, the rolls and the outer edge of the ribs do not slide with respect to each other. Because of this, the ribs are deformed in a controlled manner. In the apparatus shown in FIG. 1, the outer edge of the ribs is exposed to heating, so that the ribs will be T-shaped in cross-section. For instance, a heating effect directed to the middle of the ribs would cause a projection to be formed on both sides of the ribs in the middle of its height.

T-shaped ribs in a plastic pipe are especially suitable for efficient sealing in socket joints due to the advantageous shape of the grooves between the ribs. This is because the width of the sealing grooves in the longitudinal direction of the pipe is greater in the vicinity of the pipe wall than at the outer edges of the ribs, so that a sealing groove widening towards the pipe wall is obtained. It is thereby possible to use seals having a width much greater than the width of the groove without any risk of the seal coming off the groove.

In addition, the pipe produced by the method according to the invention is calibrated both with respect to its inner and outer diameter, wherefore the depth of the sealing groove is known accurately.

If desired, the ribs can be compressed to such an extent that the projections of adjacent ribs are in contact with each other. In such a case a substantially smooth surface is formed in the plane of the outer surface of the projections.

As distinct from the above, the apparatus according to the invention may also be used apart from the pipe producing means, in which case the ribs, of course, have to be heated in one way or another before rolling. If required, several rolling means according to the invention may be placed in succession, and they may deviate in shape from those described above. The diameter of a circle along which the rolls are positioned is thereby the smaller the farther in the direction of motion of the pipe the rolling means are positioned, so that the means compress the outer edge of the ribs in a stepwise manner. Accordingly, the rolling means may be e.g. conical.

We claim:

1. Apparatus for providing annular ribs of a plastic pipe with oppositely sideward projections, comprising:

rib rolling means for surrounding the plastic pipe having the annular ribs, the rib rolling means defining a conical rib-engaging rotation surface decreasing in diameter in a direction of relative pipe movement, the rib rolling means comprising elongated rolls rotatable about respective axes disposed circumferentially around the pipe, and means for relatively moving the rib rolling means longitudinally to the pipe and rotatingly around a longitudinal axis of the pipe for gradually compressing the ribs annularly and forming the oppositely sideward projections on each of the ribs.

2. Apparatus according to claim 1, wherein the axes of the rolls are inclined diametrically with respect to the longitudinal axis of the pipe.

3. Apparatus according to claim 1, wherein the axes of the rolls are each at a laterally oblique angle to the longitudinal axis of the pipe.

4. Apparatus according to claim 1, wherein the rolls are of a length such that they cover a section of the pipe comprising 5 to 25 ribs.

5. Apparatus according to claim 1, wherein the rolls have smooth surfaces, or spiral grooves are provided in surfaces of the rolls, the width of the grooves corresponding to the width of the ribs at the projections.

6. Apparatus according to claim 5, wherein shoulders extending in a longitudinal direction of the grooves are provided at the bottoms of at least some of the grooves for forming further grooves in outer surfaces of the projections, the further grooves being positioned in a plane of side surfaces of the ribs.

7. Apparatus according to claim 3, wherein an inclination of the axes of the rolls with respect to the longitudinal axis of the pipe is 2 to 15%, and the oblique angle with respect to the longitudinal axis is from 4° to 45°.

8. Apparatus according to claim 1, wherein the rolls are heatable and include driving means.

9. Apparatus according to claim 1, further comprising at least one additional rib rolling means positioned in succession in the direction of relative pipe movement, the diameter of a circle along which the rolls are positioned being smaller the farther in the direction of relative pipe movement the additional rib rolling means are positioned.

10. Apparatus according to claim 1, further comprising a heating device surrounding the pipe and disposed before the rib rolling means in the direction of relative pipe movement, the heating device subjecting the ribs to a heating effect at points which are to be compressed.

11. Apparatus according to claim 1, wherein the rolls are conical.

12. Apparatus according to claim 2, wherein the axes of the rolls are each at a laterally oblique angle to the longitudinal axis of the pipe.

13. Apparatus according to claim 11, wherein the axes of the rolls are each at a laterally oblique angle to the longitudinal axis of the pipe.

14. A method for providing annular ribs of a plastic pipe with oppositely sideward projections, comprising:

surrounding the plastic pipe having the annular ribs with rib rolling means and relatively moving the rib rolling means longitudinally to the pipe and rotatingly around a longitudinal axis of the pipe, the rib rolling means defining a conical rib-engaging rotation surface decreasing in diameter in the direction of the relative movement of the pipe for gradually compressing the ribs annularly and forming the oppositely sideward projections on each of the ribs and the rib rolling means comprising elongated rolls rotatable about and rotating about respective axes disposed circumferentially around the pipe.

* * * * *